United States Patent [19]

Tash

[11] Patent Number: 4,865,062

[45] Date of Patent: Sep. 12, 1989

[54] VALVE ASSEMBLY FOR A PIPE FLUSHING DEVICE

[76] Inventor: George Tash, 18658 Chase St., Northridge, Calif. 91324

[21] Appl. No.: 315,678

[22] Filed: Feb. 27, 1989

Related U.S. Application Data

[62] Division of Ser. No. 176,966, Apr. 4, 1988, Pat. No. 4,825,900.

[51] Int. Cl.⁴ .......................... B08B 9/02; F16L 55/00

[52] U.S. Cl. .................................... 134/167 C; 4/255; 4/256; 137/240; 137/375; 137/843

[58] Field of Search ........... 134/166 C, 167 C, 168 C, 134/169 C; 137/240, 375, 843; 138/90, 93; 4/255, 256, 257; 251/5, 61.1, 367, 368; 239/552, 562, 570, DIG. 13

[56] References Cited

U.S. PATENT DOCUMENTS

| | | | |
|---|---|---|---|
| 3,552,426 | 1/1971 | Hester | 137/375 |
| 3,595,255 | 7/1971 | Mulinex | 4/256 |
| 3,714,951 | 2/1973 | Lundman | 4/256 |
| 3,792,708 | 2/1974 | Tash | 137/843 |
| 3,802,449 | 4/1974 | Mulinex | 4/256 |
| 3,840,033 | 10/1974 | Warsinger | 4/256 |
| 3,937,404 | 2/1976 | Johnson | 137/240 |
| 4,274,436 | 6/1981 | Smith | 137/375 |
| 4,475,255 | 10/1984 | Tash | 4/256 |
| 4,606,364 | 8/1986 | Tash | 134/167 C |

*Primary Examiner*—George L. Walton

[57] ABSTRACT

An improvement in a pipe flushing device is provided. The device includes a hollow, elastomeric tubular member expandible by water pressure and having open opposite ends. A hose connector is connected to the inlet end thereof and a valve connected to a transverse groove in the outlet end thereof. The valve includes a hollow cylindrical cage with open sides and front and a rear transverse closure plate sealing the rear end thereof. The plate may have a peripheral flange and in any event seats in the transverse groove. An elastomeric sheath which is both flexible and resilient forms the improvement. The sheath removably covers the exterior of the rear closure plate and helps seal the valve in the groove to prevent fluid by-pass except when the tubular member is expanded. The sheath may have a roughened slip-resistant exterior surface or striations in the exterior thereof to improve the seal and may enclose a portion of the sides of the cage. Alternatively, the sheath can cover the whole valve except the open front thereof and in such instance has perforations in the cage side-covering portion to allow water access to the interior of the cage. The sheath and valve cage form an improved valve assembly.

10 Claims, 2 Drawing Sheets

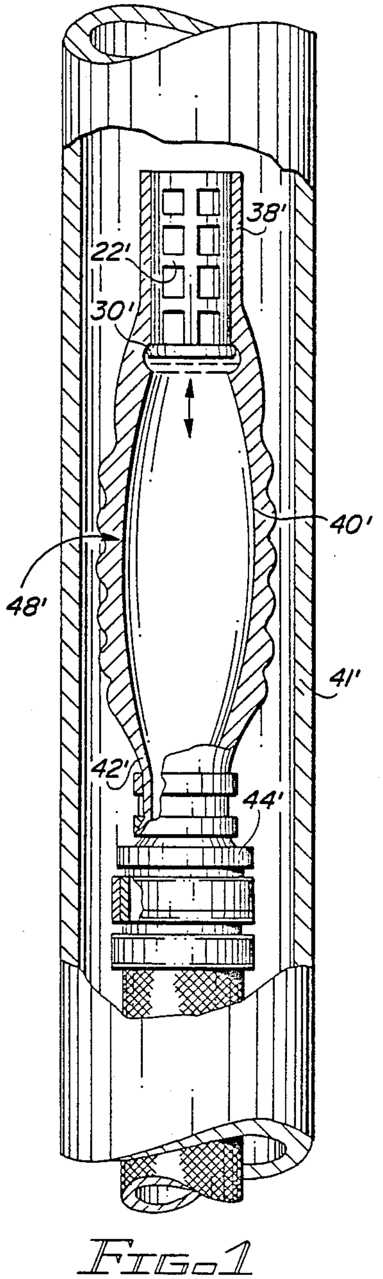
FIG. 1
(PRIOR ART)
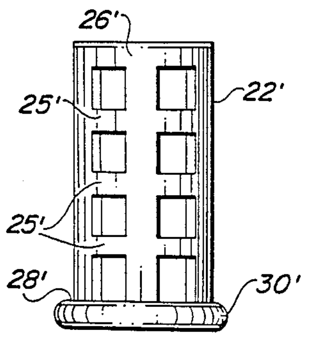
FIG. 2
(PRIOR ART)
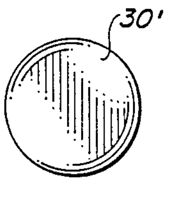
FIG. 3
(PRIOR ART)
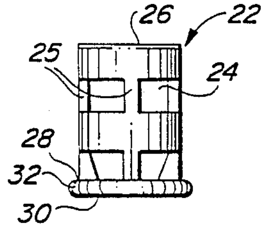
FIG. 4
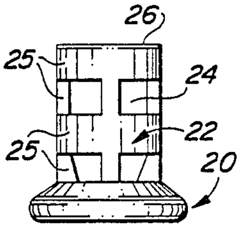
FIG. 5
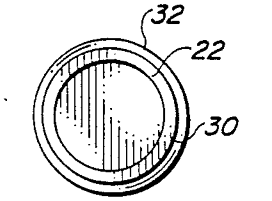
FIG. 6
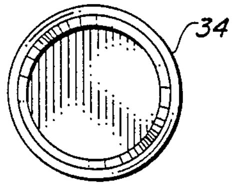
FIG. 7
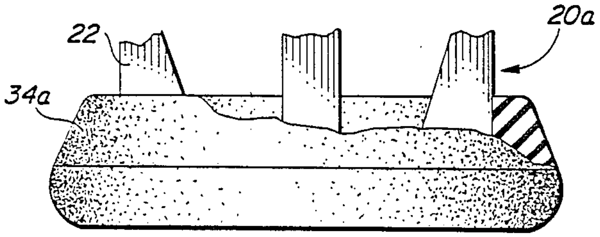
FIG. 8
FIG. 11
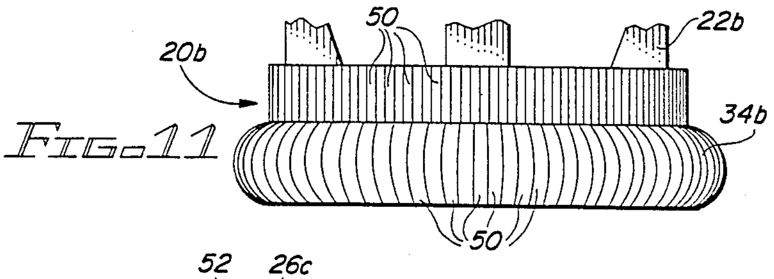
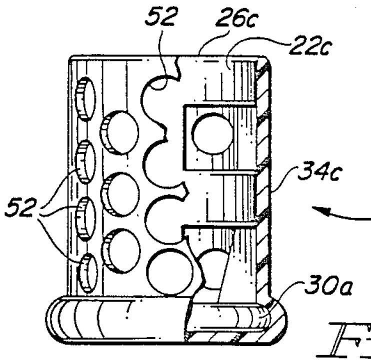
FIG. 12

VALVE ASSEMBLY FOR A PIPE FLUSHING DEVICE

This is a division of application Ser. No. 176,966 filed 4/4/88 now U.S. Pat. No. 4,825,900.

BACKGROUND OF THE INVENTION

1. Field of the Invention

The present invention generally relates to a valve and, more particularly to an improved valve assembly for a pipe flushing device.

2. Prior Art

U.S. Pat. No. 4,475,255 which issued to the inventor of the present application disclosed an improved form of flushing device for unclogging water pipes and the like. Such device included an elongated, generally cylindrical, elastomeric, hollow tubular member bearing a hose connector at its inlet end and valve at its outlet end. The valve is in the form of a hard plastic or metal cage having a rigid transverse rear closure plate bearing a peripheral flange disposed in a transverse groove in the interior wall of the outlet. The groove is of a length greater than the thickness of the plate, but the plate diameter is such that the outlet wall grips the periphery of the plate to hold the cage in a fixed position and seal the outlet when the tubular member is in the unexpanded state. The cage has open sides and front.

When water is passed into the hollow tubular member through a hose connected to the inlet end thereof, while the tubular member is installed in a water pipe to be flushed, a cycle begins. First., the middle portion of the tubular member expands to the pipe diameter and causes the cage to slip rearwardly in the groove. This, in turn, causes a sonic vibration in the tubular member and pipe. The expansion also permits the expansion water to by-pass the plate in the groove as the plate is moved to a selected point rearwardly in the groove, the water passing out the outlet through the cage sides and front as a jet. This, in turn, results in a contraction of the middle portion of the tubular member, forcing the cage forward, causing a second sonic vibration and closing of the valve. The cycle then automatically repeats very rapidly so that water jet pulses and mechanical vibrations emanate rapidly from the device to easily dislodge the most stubborn pipe clogs. The jet expulsion also sets up strong mechanical vibrations in the device and pipe. The cycles are discontinued when water pressure is dissipated by disconnecting the hose from the device or bleeding water through the hose.

Such a device has proven to be very useful. However, it has also been found that inadvertant leakage of water around the rear closure plate frequently occurs, with some loss of efficiency.

It is believed that the leakage is due to the inability of the rear closure plate to conform to slight irregularities in the transverse groove in the tubular member outlet portion and also due to the fact that the plate is both hard and smooth and thus apt to slip out of place.

There remains a need for an improved valve which can provide a more positive water seal in the hollow tubular member, without sacrificing any of the desired functions of the flushing device. Such valve should be inexpensive, durable and conformable to a variety of transverse groove configurations.

SUMMARY OF THE INVENTION

The improved valve assembly of the present invention satisfies all the foregoing needs. The assembly is substantially as set forth in the Abstract. Thus, it includes a hollow, cylindrical cage with open sides and front, and a rear which is closed by a transverse closure plate. The plate may have a peripheral flange and in any event extends into the transverse groove of the tubular member to block passage of water through the tubular member except when it expands and the valve is slightly displaced. The valve includes a removable sheath which is flexible and resilient, and covers the closure plate exterior as well as a portion of the sides of the cage. The sheath may have a roughened or sand blasted outer surface for better gripping of the portions of the sidewalls of the tubular member which define the transverse groove and to prevent slipping of the valve in the groove. The sheath can also have a plurality of striations in the exterior thereof to increase the deformability thereof for better sealing of the tubular member.

In one embodiment the sheath can be slipped over the closure plate and entire sides of the cage, leaving only the cage front open. Such sheath has openings therethrough to permit passage of water into the cage. The sheath may be of soft synthetic or natural rubber or plastic and can be replaced whenever it shows signs of wear or deterioration. It is inexpensive and very effective in helping the valve to seal the tubular member.

Further features of the invention are set forth in the following detailed description and accompanying drawings.

DRAWINGS

FIG. 1 is a schematic side elevation, partly broken away and partly in section, of a prior art pipe flushing device as represented by one embodiment of the device of U.S. Pat. No. 4,475,255, showing the valve thereof in a resting sealed position (solid outline), the closure plate thereof also being depicted in dotted outline in an unsealed position.

FIG. 2 is a schematic side elevation of the valve of FIG. 1;

FIG. 3 is a schematic bottom plan view of the closure plate of the valve of FIG. 1;

FIG. 4 is a schematic side elevation of a first preferred embodiment of the improved valve assembly of the present invention, without the sheath thereof;

FIG. 5 is a schematic side elevation of the assembly of FIG. 4, showing the sheath in place on the valve of FIG. 4;

FIG. 6 is a schematic top plan view of the cage of FIG. 4;

FIG. 7 is a schematic top plan view of the sheath of FIG. 5;

FIG. 8 is an enlarged, schematic, fragmentary side elevation of a second preferred embodiment of the improved valve assembly of the present invention, showing the roughened exterior and interior of the sheath thereof;

FIG. 11 is an enlarged schematic side elevation of a third preferred embodiment of the valve sheath of the present invention; and, FIG. 12 is an enlarged schematic side elevation of a fourth preferred embodiment of the valve sheath and cage assembly of the present invention.

DETAILED DESCRIPTION

Figure 9:
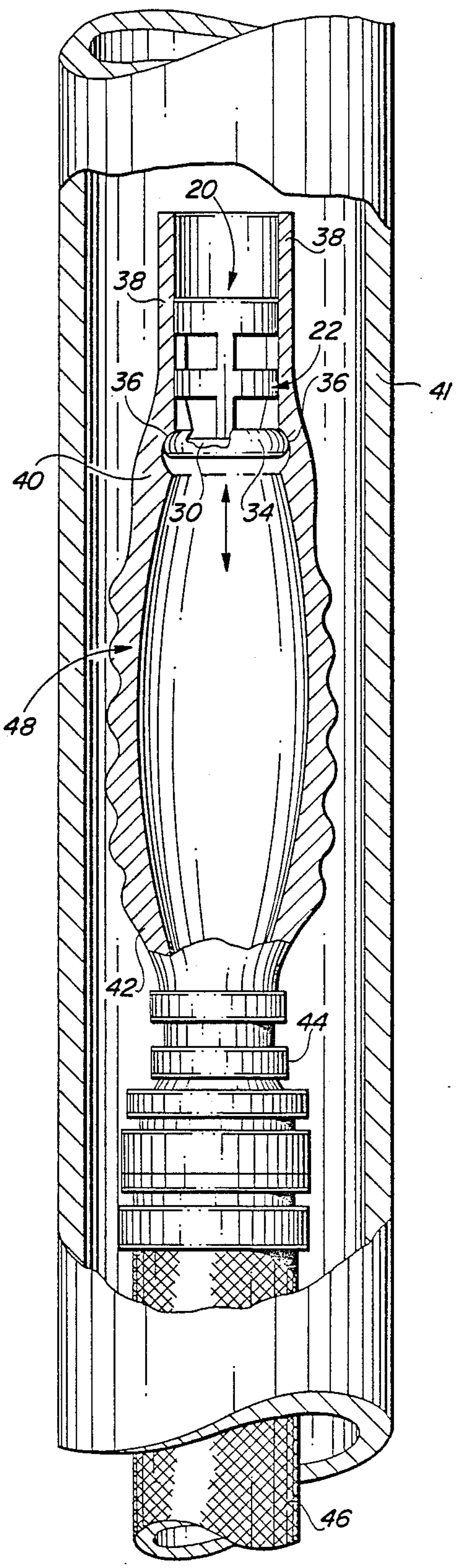
FIG. 9 is a schematic side elevation, partly broken away and partly in section, of the valve assembly of FIG. 5 in the pipe flushing device of the present invention, with the tubular member thereof in the resting valve sealing position.

FIGS. 1-7, 9 & 10.

Now referring more particularly to FIGS. 1-7 and 9 and 10 of the drawings, a first preferred embodiment of the improved valve assembly of the present invention is schematically depicted therein. Thus, valve assembly 20 is shown in FIGS. 4 and 5, comprising a generally cylindrical cage 22 of smooth hard plastic, metal or the like. Cage 22 has open sides 24 defined by spaced vertical and horizontal ribs 25 and an open front 26, and a rear 28 closed by an integral transverse closure plate 30 of the same material as cage 22. Plate 30 has a peripheral flange or rim 32 extending laterally beyond cage 22.

Assembly 20 includes an elastomeric sheath 34 of natural or synthetic rubber or plastic which removably fits over the exterior of plate 30, including rim 32, and which is flexible and resilient. Sheath 34 extends over the part of sides 24 of cage 22 which is adjacent to plate 30. Sheath 34 is sufficiently soft so that it readily conforms to irregularities in the transverse groove 36 in the outlet end 38 of hollow expandable elastomeric tubular member 40 shown in FIGS. 9 and 10.

Member 40 is shown in FIG. 9 disposed in the unexpanded state in a drain pipe 41. Member 40 is connected at its inlet end 42 by a fitting 44 to a water hose 46. Valve assembly 20 is shown in end 38 of tubular member in FIG. 9 with plate 30 in groove 36 so as to block the flow of water through pipe 41. Together with member 40 and hose connector 44, assembly 20 forms improved pipe flushing device 48 (FIG. 9).

Device 48 is identical in every respect to prior art device $48^1$ shown in FIGS. 1, 2 and 3, except(wherein components similar to those of FIG. 9 bear the same numerals but are succeeded by the prime sign ), except for the presence of sheath 34 in device 48 and its absence in device $48^1$ and except for the fact that the length of cage 22 is shown in the drawings as less than that of prior art cage $22^1$. Sheath 34 assures improved sealing of device 48 when member 40 is in the unexpanded state shown in FIG. 9.

Figure 10:
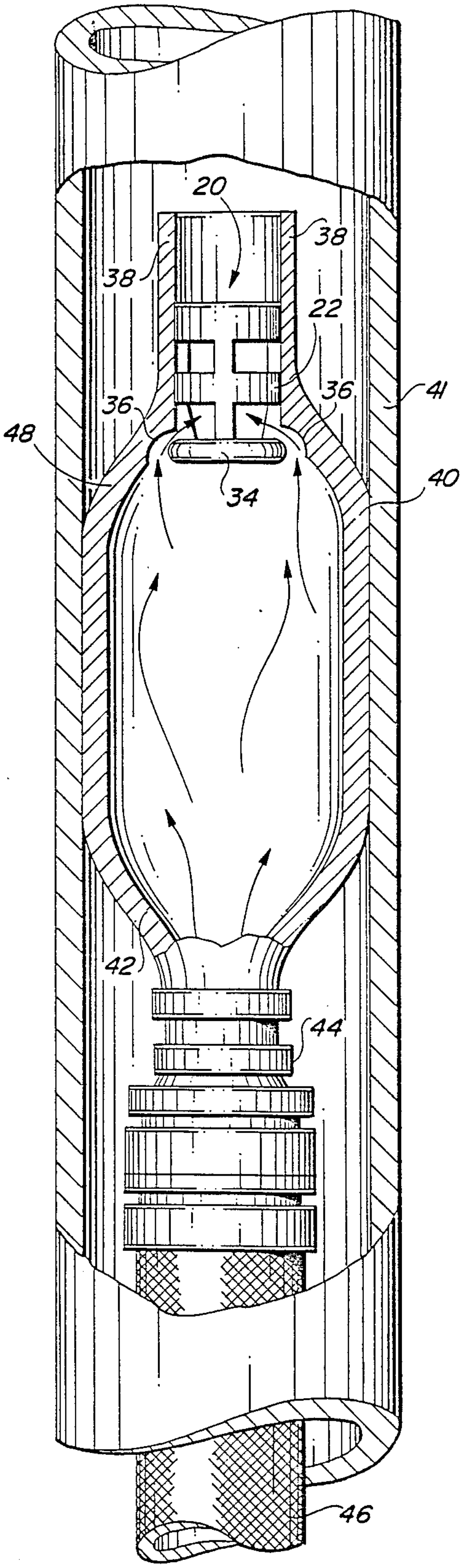
FIG. 10 is a schematic side elevation, partly broken away and partly in section, of the valve assembly of FIG. 9 in the pipe flushing device of FIG. 9 with the tubular member in the expanded state and the valve in the open state.

In FIG. 10, device 48 is shown in pipe 41 with tubular member 40 expanded laterally by passing water thereinto through hose 46 and connection 44. When this is carried out valve assembly 20 moves to the position shown in FIG. 10 with water then by-passing plate 30, as shown by the arrows in FIG. 10 so that it passes into cage 22 and can exit outlet 38. The cycle of operation is identical to that previously described for operation of U.S. Pat. No. 4,475,255 (see prior art section above), except that more positive sealing of member 40 occurs when it is in the unexpanded condition (FIG. 9), due to the presence of replaceable soft elastomeric sheath 34. Sheath is inexpensive, durable, simple and efficient.

FIG. 8.

A modified form of the sheath of the present invention is schematically depicted in FIG. 8. Thus, sheath 34*a* is shown, identical in all respects to sheath 34 except that the inner and outer surfaces thereof are roughened, sandblasted or the like to provide a non-slip better sealing effect on outlet 38. FIG. 8 shows sheath 34*a* installed on cage 22 to form assembly 20*a*.

FIG. 11.

A third preferred form of the sheath of the present invention is schematically depicted in FIG. 11. Thus, sheath 34*b* is shown over cage 22*b* to form assembly 20*b*. Sheath 34*b* includes a plurality of tiny parallel striations 50, grooves or the like in the exterior thereof. Striations 50 have the effect of increasing the deformability of the exterior of sheath 34*b*, rendering it better able to conform to irregularities in groove 36 and thus more effectively seal end 38.

FIG. 12.

A fourth preferred embodiment of the valve assembly of the present invention is schematically depicted in FIG. 12. Thus, assembly 20*c* is shown, which includes cage 22*c*, the sides of which are longer than those of cage 22. Moreover, sheath 34*c* entirely encloses cage 22*c* except for the open front 26*c* and is provided with spaced apertures 52 in all portions thereof, except that area which covers plate 30*c*. Apertures 52 permit passage of water into cage 22*c*. Assembly 20*c* performs efficiently and has the advantages of assemblies 20, 20*a* and 20*b*.

Various other modifications, changes, alterations and additions can be made in the improved valve assembly and pipe flushing device of the present invention, their components and parameters. All such modifications, changes, alterations and additions as are within the scope of the appended claims form part of the present invention.

What is claimed is:

1. In a pipe flushing device having an elongated elastomeric hollow tubular member having a generally central passageway extending through the length thereof, a middle portion which is radially expansible under water pressure, an open rear inlet end and an open front outlet end; a hose connector connected in sealing engagement with said rear inlet end, and a valve in said front outlet end, said valve comprising a cage having a rear closure plate disposed across said outlet end and secured in a transverse groove in said tubular member outlet end, said groove being of a length longer than the thickness of said plate, said valve having open sides and front, said outlet end holding said valve in a fixed position to close said outlet when said tubular member is in the relaxed state and permitting longitudinal movement of said valve cage, while retaining said plate in said groove, upon expansion under water pressure of said tubular member, said expansion also permitting water to by-pass said closure plate through said groove and pass through said cage sides and front as a water jet, pulsations of said jet setting up mechanical vibrations, said jets and pulsations being effected by alternate expansion and contraction of said tubular member under water pressure to unclog a pipe, the improvement which comprises a flexible, resilient, elastomeric sheath covering the outside of said valve rear closure plate and extending over the side margins thereof for improved sealing engagement with said transverse groove in said tubular member wherein the presence of said sheath serves to correct and wear irregularities created within said groove, when said tubular member and groove are n a relaxed state.

2. The improvement of claim 1 wherein said sheath is removable and has a roughened slip-resistant exterior to improve said sealing engagement and wherein said rear closure plate has an annular peripheral flange.

3. The improvement of claim 1 wherein said sheath is removable and has a plurality of parallel striations in the exterior thereof to improve its flexibility and said sealing engagement.

4. The improvement of claim 1 wherein said sheath covers said rear closure plate and the portion of said cage adjacent thereto.

5. The improvement of claim 1 wherein said sheath has a rear portion which covers said rear closure plate and a front portion integral with said rear portion and covering the sides of said cage, said front portion defining a plurality of spaced apertures providing access to the interior of said cage.

6. An improved valve assembly for a pipe flushing device having a radially expandable hollow tubular member with a hose connector sealed to the rear inlet end thereof and a transverse groove adapted to receive the periphery of a valve, and to provide liquid by-pass around said valve only when said tubular member is expanded, said valve assembly comprising, in combination:

(a) a generally cylindrical hollow valve cage having open sides and front and a rear closure plate secured thereto, sealing the rear of said cage, and adapted to ride in said transverse groove sealing said groove; and, (b) a flexible, resilient elastomeric sheath removably covering the outside of said rear closure plate and extending over the side margins thereof for improved sealing engagement with said transverse groove wherein the presence of said sheath serves to correct any wear irregularities created within said groove, when said tubular member and groove are in a relaxed state.

7. The improved assembly of claim 6 wherein said sheath has a roughened slip-resistant exterior to improve said sealing engagement.

8. The improved assembly of claim 6 wherein said sheath has a plurality of parallel striations in the exterior thereof to improve its flexibility and said sealing engagement.

9. The improved assembly of claim 6 wherein said sheath covers said rear closure plate and the portion of said cage adjacent thereto.

10. The improved assembly of claim 6 wherein said sheath has a rear portion which covers said rear closure plate and a front portion integral with said rear portion and covering the sides of said cage, said front portion defining a plurality of spaced apertures providing access to the interior of said cage.

* * * * *